(12) United States Patent
Fessel et al.

(10) Patent No.: US 11,714,768 B2
(45) Date of Patent: Aug. 1, 2023

(54) UNIT FOR A BUS SYSTEM, MASTER-SLAVE BUS SYSTEM WITH A PLURALITY OF UNITS, AND METHOD FOR ADDRESSING UNITS OF A BUS SYSTEM

(71) Applicant: ebm-papst Mulfingen GmbH & Co. KG, Mulfingen (DE)

(72) Inventors: Andreas Fessel, Weikersheim (DE); Markus Humm, Weissbach (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 154 days.

(21) Appl. No.: 17/399,620

(22) Filed: Aug. 11, 2021

(65) Prior Publication Data
US 2022/0050799 A1    Feb. 17, 2022

(30) Foreign Application Priority Data
Aug. 13, 2020  (DE) .......................... 102020121316.6

(51) Int. Cl.
*G06F 13/362*    (2006.01)
(52) U.S. Cl.
CPC .................................. *G06F 13/362* (2013.01)
(58) Field of Classification Search
CPC ...................................................... G06F 13/362
See application file for complete search history.

(56) References Cited

U.S. PATENT DOCUMENTS

| | | | | |
|---|---|---|---|---|
| 9,130,773 | B2* | 9/2015 | Buttner | H04L 61/5038 |
| 9,772,966 | B2* | 9/2017 | Cherkaoui | H04L 12/42 |
| 10,572,418 | B2* | 2/2020 | Fuchs | G06F 21/606 |
| 10,929,328 | B2* | 2/2021 | Kastli | H04L 12/10 |
| 11,411,767 | B2* | 8/2022 | Jerolm | H04L 12/40006 |
| 2009/0125656 | A1* | 5/2009 | Haas | H04L 61/00 710/104 |
| 2016/0077990 | A1* | 3/2016 | Tsujita | G06F 13/4291 710/104 |
| 2016/0292106 | A1* | 10/2016 | Spiegel | H04L 12/40202 |
| 2018/0334114 | A1* | 11/2018 | Sugimoto | B60R 16/0207 |

* cited by examiner

*Primary Examiner* — Henry Tsai
*Assistant Examiner* — Christopher A Daley
(74) *Attorney, Agent, or Firm* — Dickinson Wright PLLC

(57) ABSTRACT

The disclosure relates to a unit for a bus system, a master/slave bus system with such units, and a method for assigning individual unit addresses for units of a bus system, wherein through the use of an enable signal, which is relayed from unit to unit, only one unit is respectively in an allocation mode in which the unit that is respectively in the allocation mode is allocated an individual unit address so that the units of the bus system can each be allocated with the unique individual address one after the other in the sequence of their cabling.

15 Claims, 1 Drawing Sheet

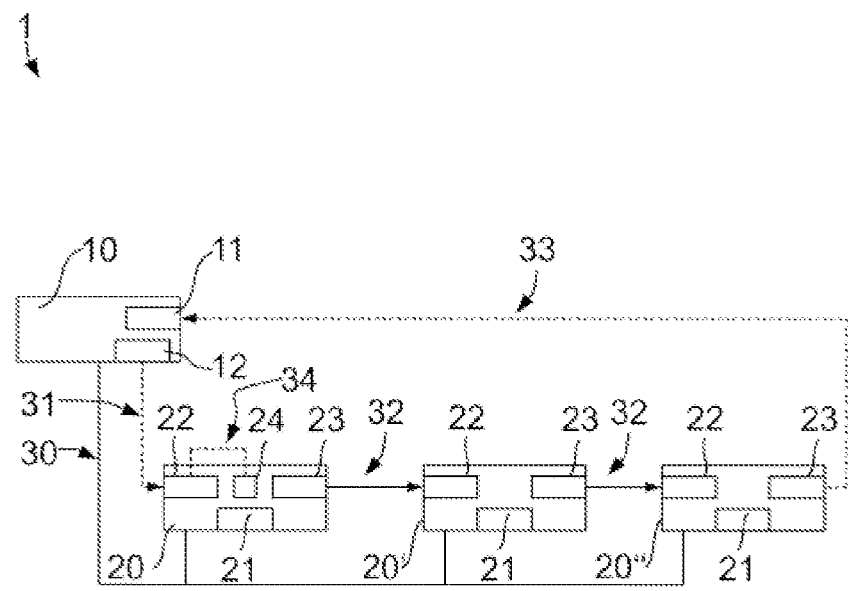

UNIT FOR A BUS SYSTEM, MASTER-SLAVE
BUS SYSTEM WITH A PLURALITY OF
UNITS, AND METHOD FOR ADDRESSING
UNITS OF A BUS SYSTEM

RELATED APPLICATIONS

This application claims priority to German Patent Application No. 10 2020 121 316.6, filed Aug. 13, 2021, the entire contents of which are incorporated herein by reference in their entirety.

FIELD

The disclosure relates to a unit for a bus system, a master-slave bus system comprising a plurality of such units in the form of slave units, and a method for addressing a plurality of units of a bus system.

BACKGROUND

A wide variety of bus systems along with their components and methods for addressing the components have already been known for a long time in the prior art.

In this connection, in master/slave-based systems, there is basically one master unit or master and at least one, but preferably several slaves or slave units, which are addressed by the master, i.e. can be controlled by it. In this connection, the commands or messages of the master are transmitted via an at least half-duplex-capable bus system and a bus line of this bus system, wherein the commands of the master, together with an address of the slave that is to be controlled, are transmitted to all slave units of the system. Although all of the slaves receive or "hear" the commands, the only the slave that accepts the command and executes it is the one which itself has the same address with which the command was transmitted.

Independently of the bus system, the bus line can be provided with plug adapters and be routed from the master to a first slave and connected in series from slave to slave. Alternatively, there can be a looped connection through the slaves, i.e. one in which a respective bus line leads from the master to the first slave and then from slave to slave, which likewise produces a series connection of the slaves, yielding a bus topology.

Since a command is transmitted by the master to all of the slaves via the bus line, all of the slaves "hear" or receive the command, but only the slave that is actually being controlled is supposed to react. It is clear from this that the master must know the addresses of all of the slaves that are to be controlled and each slave must have an individual address that is unique within the bus system.

Manual, semi-automatic, and automatic methods for allocating such an address are used in the prior art, which are based, for example, on the fact that the addresses of the slaves are incrementally increased in a sequence that is defined by their connection to one another until the last slave of the series has been addressed.

But this has the disadvantage that the addresses that are assigned are predetermined and are subject to a fixed pattern. In this case, it is not possible to assign the slaves "arbitrary" addresses, which deviate from the predetermined fixed pattern.

There are also variants of address assignment in which an address for the slaves is written into a memory by means of a parameterization that is performed manually in each respective slave, a process that must then be repeated for each slave and wherein the addresses must also be communicated to the master, which results in a high cost.

There are also known solutions that are based on a control line leading from slave to slave, which controls the slaves during an addressing procedure; in this case, the control line—or more precisely, a signal transmitted via the control line—is looped into the slaves, for example controlled by means of a switch. Such an embodiment, however, has the disadvantage that all of the slaves must necessarily be connected by means of the control line, which can be problematic in the case of slaves that are far apart from one another, and has the disadvantage that the control line or the associated bus system usually has to transmit complex commands or complex signal sequences in order to control an addressing procedure so that on the whole, such methods are subject to a high degree of complexity.

BRIEF SUMMARY

One object of the disclosure, therefore, is to overcome the above-mentioned disadvantages and to provide a slave unit for a master/slave bus system, a master/slave bus system having such a slave unit, and a method for address assignment in a master/slave bus system having a plurality of slave units, that enable a flexible and at the same time simple address assignment or address allocation of the slave units.

This object is attained by the feature combination according to claim 1.

According to the disclosure, a unit for a bus system is proposed, which is preferably a slave unit of a master/slave bus system. According to the disclosure, the unit has a bus interface, a control input for receiving an input signal and a control output for sending an output signal. The control input is connected to an input circuit for processing the input signal and the control output is connected to an output circuit for generating the output signal. The unit also has an address memory, which is embodied to store a broadcast address—which is collective, i.e. identical and preferably unmodifiable for all of the units of a bus system—and an individual unit address. Furthermore, the address memory can be embodied to additionally store an allocation address that is collective and thus identical for all of the units. The address memory also be arranged in a distributed fashion and be embodied by means of various memory technologies so that for example the broadcast address and optionally the allocation address is/are stored in the unit in an unmodifiable way. The broadcast address can be correspondingly defined in a fixed way. For example, the address "0" is unmodifiably fixed for the broadcast address and "247" is unmodifiably fixed for the allocation address. According to the disclosure, the output circuit is also embodied to generate the output signal that is present at the control output from a supply voltage of the unit or from an external voltage and therefore does not have to be connected to the control input or to the input circuit. For example, the control output can be an open collector—or more precisely, an open-collector output—or the output circuit can include such an element, wherein the external voltage can then be a voltage that is obtained from a subsequent unit. Correspondingly, the output circuit is preferably embodied to generate the output signal that is present at the control output independently of the input signal or in a way that is dependent only on a higher-level control logic, wherein the higher-level control logic is preferably embodied to process the input signals that are processed in the input circuit and to control the output circuit as a function of a stored logic.

One basic principle of the disclosure in this connection is to provide a unit for a bus system, a master/slave bus system, and a method for addressing the units that enable the assignment of individual unit addresses for the units, wherein through the use of an enable signal that is relayed from one respective unit to the next respective unit, only one unit is respectively in an allocation mode in which the unit that is respectively in the allocation mode is allocated an individual unit address so that the units of the bus system can each be allocated with the unique individual address one after the other in the sequence of their cabling. In this connection, the sequence of the cabling is understood to be the sequence that can be established by means of the control line or by means of the plurality of control lines.

Preferably, the unit, which can be a slave unit or slave, is embodied to react to both a command addressed to the collective broadcast address or optionally to a command addressed to the individual unit address, wherein a command sent to the broadcast address causes all of the units functioning as slaves and connected to a master of a master/slave bus system to react. If an allocation address is provided, then the units are preferably embodied—at least in a particular mode—to react to it as if the allocation address were an individual unit address. When a command or message is sent to the broadcast address, the master does not expect a response from the slaves. By contrast with this, after the receipt of a command addressed to the individual unit address, the respective unit that is being addressed, which has this address, preferably confirms the receipt of the command or the fact that it is being processed or handled or depending on the command, sends a corresponding reply.

For example, the address space for the collective broadcast address and the individual unit address is 0 to 247, wherein for example "0" can be unmodifiably preset as the broadcast address and thus the addresses 1 to 247 remain available for an individual addressing. In addition, however, there can also be other broadcast addresses or other special addresses such as the allocation address to which the slaves react only under certain conditions such as when operating in a particular mode like an addressing or allocation mode.

For bus systems, which are supposed to have as many units as possible, it is therefore advantageous to block as few addresses as possible with such broadcast addresses or other special addresses in order to thus be able to allocate as many unit addresses as possible from the available address space. In bus systems that are designed or provided for a predetermined or generally lower number of units, however, in order to increase security and simply the method, it is also possible to use a plurality of broadcast addresses or other special addresses such as the allocation address. Preferably, an address memory that is present in the slaves of such a bus system is correspondingly embodied to also store these additional broadcast addresses and/or special addresses, wherein for this purpose, the address memory can be embodied not as a single unit, but instead for example as a non-volatile memory and a volatile memory, and can thus be distributed and be embodied as partially non-volatile.

The bus interface also preferably has an input and an output so that for example a plurality of network or Ethernet cables can be used as the bus line, wherein each cable connects two units to each other and a cable leads from the master to one of the units and preferably to a first unit of a series of units that are connected to one another.

In an advantageous variant of the unit, the input circuit, the output circuit, the control input, and the control output are separated from one another on a circuitry level and/or are connected to one another only by means of a higher-level circuit logic. Correspondingly, the input circuit and the output circuit can be used independently of each other and aside from an address allocation, can perform various other functions. In addition, the input circuit can process an input signal and the output circuit can send an output circuit or output-side signal, which differs from the input signal or input-side signal. If the control input and the control output and their respective circuits are separated only by means of a switch or are connected by means of a switch, then the input signal can only be looped through by the closing of the switch so that a separation of the control input and control output achieves a high degree of flexibility in comparison to an embodiment with contacts that are looped-through or are separated only by means of a relay or switch.

In a first advantageous variant, the control input is a digital input and the input circuit is correspondingly embodied to process a digital signal that is present at the control input. Alternatively, in a second variant, the control input is an analog input and the input circuit is correspondingly embodied to process an analog signal that is present at the control input.

In an advantageous embodiment, the control output is likewise a digital output and the output circuit is embodied to generate a digital signal that is present at the control output. Alternatively to this, the control output can be an analog output and the output circuit can be embodied to generate an analog signal that is present at the control output. An open collector is also understood to be a special instance of a digital output, which can also be referred to as an open-collector output. Correspondingly, the control output can alternatively be an open collector and the output circuit can be embodied to generate a digital signal that is present at the control output, but this signal is generated from the voltage that is present at the output. If, as will be explained below, the control output of a unit is connected to the control input of a subsequent unit, then the open-collector output obtains its supply voltage from the subsequent unit and its input circuit (digital input) is connected to ground.

If the control input is a digital input, then the control output is preferably a digital output, which likewise applies for an analog input and analog output. Through a separation of the control input and control output at the circuitry level, however, it is also possible for there to be mixed forms in which the control input is a digital input and the control output is an analog output or vice versa.

Correspondingly, the control input is preferably embodied to receive only one signal and the control output is preferably embodied to output or send only one signal. Since the control input and control output are not interchangeable or universally usable, the input circuit is also preferably embodied exclusively for processing the input signal and the output circuit is preferably embodied exclusively for generating the output signal.

Depending on a function of the control input and the control output, however, which are supposed to fulfill this function independently of an addressing of the units, it is also possible for control-related reasons for the output circuit to be embodied to process the input signal that is present at the control input and to generate the output signal based thereon. For example, an analog input signal can be converted into an output digital signal or vice versa.

In a variant, the unit also advantageously has a voltage output that is preferably supplied by a supply voltage of the unit, wherein the supply voltage can be looped through to it or the terminals for the power supply of the unit can be integrally used as a voltage output. Such a voltage output can be connected directly to the control input—for example in order to start an addressing procedure since it is thus possible to supply the control input of the first unit in the series and as a result of this, the first unit is "markable." In addition, the method according to the disclosure that will be explained in greater detail below can be started directly through a bridging of the voltage output to the control input. Alternatively, the unit can have such a voltage output, wherein the latter is or can be connected to the control input via a for example manually or electrically actuatable potentiometer or via a for example manually or electrically actuatable switch. If such a potentiometer or such a switch is electrically actuatable, then such an element can preferably be actuated by the unit or more precisely by a command that the master addresses to the unit and can thus be controlled by the master. It is thus possible, for example, for the first unit of a series of units that are connected to each other to be "marked" and for an addressing procedure to be started or initialized independently of the control output by the action of a voltage on the control input. Through the connection of the voltage output to the control input and the action of the voltage or signal on the control input, this signal serves as an enable signal, which will be explained in greater detail below, so that an addressing or an allocation can be initiated and the respective slave can be switched, for example, into the allocation mode, which will be explained in greater detail below. As a result, it is not absolutely necessary for the slave to be connected via the control input to the master or to a preceding slave.

If an electrically actuatable switch or an electrically actuatable potentiometer is provided, then a command for the actuation can be transmitted for example via the bus interface or more precisely, from the master. In this case, then, either the address of the slave that is to be controlled must be known, which is most often not the case, or the voltage output is only permitted to be bridged to the control input of one unit out of a plurality of units provided as slaves in a master/slave system. From the second variant, in which the voltage output is bridged to only the first unit of a plurality of units connected in series, the command for actuating the switch can be transmitted to the broadcast address so that the switch of all of the units is actuated; then the control input is or can be connected to the voltage output only in the first unit of the series so that only in the first unit of the series does the command result in a signal or more precisely, an enable signal, at the control input and thus in a start of the addressing procedure.

For the addressing of the unit, the latter is also preferably embodied as or preferably has a control unit or circuit logic, by means of which the unit is embodied:

to switch from an operating mode into an addressing mode upon receipt of an addressing command addressed to the broadcast address via the bus interface or upon receipt of another signal, in the addressing mode, to generate an inhibiting signal with the output circuit and to send the inhibiting signal as an output signal at the control output and upon receipt of an enable signal at the control input, to switch from the addressing mode into an allocation mode and preferably to remain in the allocation mode as long as the inhibiting signal is being generated and being sent as an output signal, wherein the inhibiting signal and the enable signal can each be a predetermined constant voltage value between 0 and 10 V, for example, and the voltage value for the inhibiting signal and the enable signal are different from each other, in the allocation mode, to store an address, which is received via the bus interface, as an individual unit address in the address memory and after the storage of the unit address, to switch from the allocation mode into a wait mode, wherein preferably, the individual unit address is transmitted to the unit via the bus interface, addressed to the broadcast address or addressed to the preferably collective allocation address and wherein a message or command, which is addressed to the allocation address and contains the address, is accepted and processed only by a unit that is in the allocation mode, in the wait mode, to generate an enable signal with the output circuit and to send the enable signal as an output signal at the control output, wherein the wait mode corresponds either to a separate mode that is provided by programming or corresponds to the preceding addressing mode, which is then preferably embodied to only permit a switching from the addressing mode into the allocation mode if an enable signal is not being transmitted as an output signal or more precisely if an inhibiting signal is being transmitted as an output signal.

The enable signal, which can be sent to a subsequent unit via the control output, can be generated automatically upon the switch from the allocation mode into the wait mode or back into the addressing mode, or alternatively, can be generated after the transmission of a corresponding command via the bus interface.

In order to prevent a unit that has already been allocated a new unit address from being inadvertently once again allocated another address during the allocation of addresses to other units, the unit preferably also has an inhibition circuit. The unit or more precisely the inhibition circuit is embodied to allow or enable a switching into the allocation mode only if the control output sends an inhibiting signal and the enable signal is present at the control input.

Another aspect of the disclosure relates to a master/slave bus system with a master and a plurality of units according to the disclosure functioning as slave units, which are correspondingly referred to as slaves below. The master or master unit is connected via at least one bus line to the slaves of the plurality of slaves. Respective pairs of slaves of the plurality of slaves are connected to each other via a control line, which connects the control output of a first slave to the control input of a second slave so that the slaves of the plurality of slaves are connected to one another in series by means of the respective control lines. The master is preferably correspondingly embodied to send commands and in particular the commands in accordance with the method according to the disclosure via the bus line to all of the units or selectively to units with individual unit addresses or selectively only to enabled individual units.

Although not absolutely necessary, but advantageously for the notification of a complete addressing of all of the slaves of the master/slave bus system, in a variant of the master/slave bus system, the control output of a last slave in the series of slaves that are connected to one another is connected to the master or more precisely to a control input of the master that is provided for this purpose via another or last control line, which can alternatively also be referred to as the reply line.

In order not to have to start the addressing of the slaves by the addressing of the first slave of the series of slaves, either manually or by a corresponding cabling at the first slave, but instead to be able to start it directly by means of the master, the master or a control output of the master that is provided for this purpose is connected to the control input of a first slave in the series of slaves that are connected to one another via another or first control line, which can also be referred to as the start line or initial line.

Another aspect of the disclosure also relates to a method for addressing a plurality of units, which are connected via at least one bus line to a master preferably in series with one another to form a bus system, the latter preferably being a master/slave bus system in which the units function as slaves. The units preferably correspond to the units according to the disclosure and the bus system corresponds to the master/slave bus system according to the disclosure. In this case, each unit of the plurality of units has a respective bus interface for connection to the bus line, a control input for receiving an input signal, and a control output for sending an output signal. The control input is connected to an input circuit for processing the input signal and the control output is connected to an output circuit for generating the output signal. As described above, however, these are preferably separated from one another on the circuitry level and are connected only via a higher-level control logic. Each unit also has an address memory, which is embodied to store a preferably unmodifiable collective broadcast address and a modifiable individual unit address and optionally, a preferably unmodifiable allocation address. In addition, respective pairs of units of the plurality of units are connected to each other via a control line, which connects the control output of a preceding or first unit to the control input of a subsequent or second unit so that all of the units of the plurality of units are connected to one another in series from a first unit to a last unit by means of the respective control lines. Optionally the first unit of the series can also be connected via its control input to the master and/or the last unit of the series can be connected via its control output to the master. At the beginning of the method, the units of the plurality of units can be unaddressed and can correspondingly have a default address or any unknown address as their individual unit address. At the beginning of the method, addresses can also be double-assigned. The proposed method includes at least the following steps:

a. Switching of the units from an operating mode into an addressing mode, wherein in the addressing mode, the units generate an inhibiting signal with the output circuit and send the inhibiting signal as an output signal at the control output so that the inhibiting signal is present at the control input of the subsequent units in the series. Preferably, the units are inhibited from switching into an allocation mode by means of an inhibition circuit for the duration of the presence of the inhibiting signal at their respective control input. More preferably, the units are switched from the operating mode into the addressing mode by means of command that is addressed to the broadcast address by the master.

b. Switching of the initial, preferably first unit of the units that are connected in series from the addressing mode into an allocation mode by transmission of an enable signal to the control input of the unit, wherein the unit preferably can be switched into the allocation mode only if the control output of the unit generates and sends an inhibiting signal. The transmission of the enable signal to the control input of the unit can for example be controlled by hand or manually by means of a bridging of the supply voltage to the control input or—depending on whether the control input is connected to the master or is connected to the supply voltage via a switch—can be controlled by the master. If the switching of the initial, preferably first unit into the allocation mode is controlled by the master, then the latter transmits an enable signal via the first control line. If the control input is connected via a switch to the supply voltage and the switch is can be electronically triggered, then a command to close the switch can also be transmitted for example to the broadcast address; as a result, an enable signal is present only at the first unit of the series since the control input is connected to the switch only in the first unit of the series. If serial numbers of the units or especially, a serial number of the first unit or another unique feature of the first unit is known, then the bus system can also be used to transmit a command, which is specifically executed only after the comparison and matching of the unique feature and thus exclusively by the first unit and as a result, the first unit is switched into the allocation mode.

c. Allocation of an address to the unit that is in the allocation mode by transmission of a message containing an address via the bus line to the unit and storage of the address as an individual unit address in the address memory. Preferably, the address, which can also be referred to as a new address here, is transmitted by the master to the unit via the bus line. As described above, the message or command of the master can be addressed to the broadcast address, wherein the unit or units then store the address only if they are in the allocation mode. Alternatively, the message or command of the master can be addressed to the above-mentioned allocation address, wherein only the unit that is in the allocation mode reacts to this allocation address. Such a special address or allocation address is then respectively stored in the address memory of each unit similarly to the broadcast address and is preferably unmodifiable and identical in all of the units. By contrast with the broadcast address, however, the addressed unit can send a reply to the master via the bus line, wherein because only the one unit that is in the allocation mode replies, this assures that a reply from only one unit is generated and not a reply from a plurality of units.

d. After the storage of the address, switching of the unit from the allocation mode into a wait mode, wherein in the wait mode, the output circuit of the unit generates a signal, which is sent as an output signal in the form of an enable signal at the control output of the unit to the control input of the next unit in the series of units that are connected to one another, as a result of which the next unit in the series is switched into the allocation mode. As described above, the wait mode can also once again correspond to the addressing mode, wherein a new addressing of the unit is preferably prevented by the inhibition circuit, which is only reset if the method is to be started all over again so that each unit can only be addressed once during a pass through the method for the addressing of the units.

e. Repetition of the steps of the allocation of an address and after the storage of the address, the switching of the unit from the allocation mode into the wait mode or more precisely, repetition of steps c. and d. for each unit until all of the units of the plurality of units are in the wait mode.

f. Switching of the units from the wait mode into the operating mode. The fact that all of the units are in the wait mode can be detected in various ways. First, it is possible for the last unit of the series or more precisely the control output of the last unit to be connected to the master so that upon receipt of an enable signal from the last unit of the series via the last control line or the reply line, the master knows that all of the units have been addressed. Alternatively, the addresses that have been allocated to the units are stored in accordance with a list in the master so that after the allocation of the last stored address, the master knows that all of the units have been allocated a new address, are in the wait mode, and can be switched into the operating mode. In addition, other conditions such as a time-out are possible, which can result in a switching from the wait mode into the operating mode.

If an allocation address is optionally used, then an additional time-out can also be provided. If after the transmission of the new address to the allocation address, the unit that is to be addressed does not send a reply, then the end of the addressing can be detected by means of the time-out and the addressing procedure can be discontinued.

The proposed method enables an assignment of unique addresses in the sequence of the cabling, wherein the addresses can be freely selected. Correspondingly, addresses can be flexibly assigned since by contrast with so-called shift register methods, the addresses do not have to be assigned in ascending or descending order.

As opposed to other methods, which are based entirely on a unique identification number such as a serial number, it is advantageous that the units can be addressed according to sequence and not according to such an identification number so that it is not necessary to "search through" the entire range of possible identification numbers in order to find all of the existing units.

It is also advantageous that with the proposed method, if the cable layout is known, the units can, in addition to a unit address, also be automatically or implicitly allocated a location (position of the unit according to the cable plan). The unit address therefore automatically has a position reference.

Methods and associated units are in fact known, which likewise use control lines between the units, but in this case, often several control lines are needed between the units or it is mandatory for a command to be sent to the addressed unit in order to loop a signal from the control input to the control output, which necessarily requires the use of relays and in addition, only the input signal can ever be present on the output side.

The method also preferably stipulates that in order to switch the units from the operating mode into the addressing mode, the master transmits a bus signal to all of the units via the bus line. More preferably, the transmission is carried out by sending an addressing command addressed to the broadcast address from the master to all of the units via the bus line.

After the allocation of the address and the storage of the address in the address memory, the unit is also preferably switched into the wait mode automatically or by transmission of a bus signal from the master to the unit. In this case, the bus signal or the message can be addressed to the broadcast address, the allocation address, or the newly allocated address, wherein the unit is correspondingly embodied to accept the message and process the command contained therein. The automatic switching or the switching after the transmission of a corresponding command to the broadcast address is advantageous for simplifying the method.

The features disclosed above can be freely combined with one another insofar as this is technically possible and they do not conflict with one another.

BRIEF DESCRIPTION OF THE DRAWINGS

Other advantageous modifications of the disclosure are disclosed in the dependent claims and will be presented in greater detail below together with the description of the preferred embodiment of the disclosure based on the FIGURE.

FIG. 1 shows an exemplary schematic depiction of a master/slave bus system.

DETAILED DESCRIPTION

Each unit 20, 20', 20" of the master/slave bus system 1 shown in FIG. 1 respectively has a control input 22 and a control output 23. The control output 23 of the first unit 20 is connected to the control input 22 of the second unit 20' and the control output 23 of the second unit 20' is connected to the control input 22 of the third and in this case last unit 20". The control output 23 of the last unit 20" can optionally be connected via a last control line 33, which is depicted here with dashed lines and can also be referred to as a reply line, to a control input 11 of the master 10 in order to notify the master 10 of the end of the addressing procedure, which is implemented by the transmission of an enable signal from the last unit 20" to the master 10. In addition, each of the units 20, 20', 20" has a higher-level control logic 21 implemented in the form of a microcontroller, which is embodied to evaluate and process the input signals that are processed by the input circuit and to control the output circuit in order to generate the output signal. Since the units 20, 20', 20" are provided as slaves of a master/slave bus system 1, they are also referred to as slave units or slaves.

At the beginning of the method according to the disclosure, the slaves 20, 20', 20" are not correctly addressed or are unaddressed and all have the same, incorrect, or unknown individual unit addresses as well as a predetermined and preferably unmodifiable broadcast address.

A message that is sent by the master 10 to the broadcast address is received and processed by all of the slaves 20, 20', 20", but does not result in a reply from the slaves 20, 20', 20".

For the correct function of the master/slave bus system 1, each slave unit 20, 20', 20" must have a unit address that is unique within the bus system so that a communication request by the master 10 or a message transmitted by the master 10 via the bus line 30 is processed and replied to by only one slave 20, 20', 20".

Accordingly, an address allocation is required that is as quick and uncomplicated as possible so that communication via the bus system can take place.

First, the slaves 20, 20', 20" are switched from their normal operating mode into the addressing mode by means of a command addressed to the broadcast address.

To start the addressing or more precisely, to start the allocation of addresses, the initial and in this case first slave 20 in the series slaves 20, 20', 20" that are connected to one another by means of the control line 32 is acted on at its control input 22 with an enable signal, which enables the first slave 20 in the series for the addressing.

In the exemplary embodiment shown in FIG. 1, the enable signal for the first slave 20 can be transmitted from the master 10 or more precisely from a control output 12 of the master 10 to the first slave 20, for example via a first control line 31. Alternatively, the enable signal can also be a voltage signal, wherein in order to produce the voltage signal, the control input 22 is connected to the power supply 24 via a bridge 34 or via a control element that is connected between them. The power supply can be an either constant or variable power supply in the slave itself (e.g. a +10V voltage provided to power the potentiometer) or a variable power supply that can be programmed via the bus system (e.g. a 0-24V variable DC voltage) or a voltage supplied by the master 10. This enable signal can, as is depicted by means of the first control line 31, be embodied so that it can be connected for example directly to the master 10, as a result of which in a corresponding embodiment, the master 10 can initiate the start of the method.

If the slaves 20, 20', 20" are switched into the addressing mode by a command addressed to the broadcast address, then at their control output 23, an inhibiting signal is generated, which can, for example, be a predetermined voltage between 0 and 10V.

An inhibition circuit that is respectively provided in the slaves 20, 20', 20" results in the fact that by means of an enable signal that is present at their respective control input 22, the slaves 20, 20', 20" that are in the addressing mode can be switched into the allocation mode only if and so long as the inhibiting signal is being sent at their control output 23. Conversely, this results in the fact that the slave units 20, 20', 20" cannot respectively be switched into the allocation mode if an enable signal is being generated and sent at their respective control output 23.

If the slaves 20, 20', 20" are in the addressing mode, then by means of an enable signal that is received at their respective control input 22, they can each be switched into the allocation mode in which an address that is received via the bus interface is stored in the respective slave.

After the allocation of the new unit address, the enable signal of for example 10V is generated for next slave 20', 20" in the series, as a result of which this next slave is switched into the allocation mode.

Optionally, the successful addressing can be controlled for example by a reading back of the slave address from the address memory of the respective slave unit 20, 20', 20", which in the allocation mode can be reached via the allocation address that is provided for this purpose or by means of the unit address that has been allocated to it by the bus system.

If it is specified that a slave 20, 20', 20" that is in the allocation mode is to be addressed with a new unit address by means of a command sent to an optional allocation address, then the master 10 communicates with a slave 20, 20', 20" that is respectively in the allocation mode by addressing a message to the above-mentioned allocation address, which upon receipt of the command, executes the allocation of the address and replies to the master.

If no other slave unit 20, 20', 20" is found that is enabled for the addressing or more precisely is in the allocation mode, then the addressing is concluded.

Optionally, the method can be concluded when a particular number of slave units 20, 20', 20" that are to be addressed has been reached.

Also optionally, the method can be concluded when the master 10 receives the enable signal from the control output of the last slave via the last control line 33 at a control input 11 of the master 10.

If all of the slaves 20, 20', 20" have been allocated an address, i.e. one of the conditions for the conclusion of the method has been fulfilled, then the slaves 20, 20', 20" are switched from the addressing mode into their operating mode, which can be initiated by means of a message sent by the master 10 to the broadcast addresses or to the individual, newly assigned addresses.

In terms of its embodiment, the disclosure is not limited to the preferred exemplary embodiments disclosed above. Instead, there are a number of conceivable variants, which make use of the solution presented, even with fundamentally different embodiments.

The invention claimed is:

1. A unit for a bus system having:
a bus interface;
a control input for receiving an input signal and a control output for sending an output signal;
wherein the control input is connected to an input circuit for processing the input signal and the control output is connected to an output circuit for generating the output signal;
an address memory, which is embodied to store a collective broadcast address and an individual unit address;
and wherein the output circuit is embodied to generate the signal that is present at the control output from a supply voltage of the unit or from an external voltage.

2. The unit according to claim 1,
wherein the unit is a slave unit of a master/slave bus system and the unit address is a slave address.

3. The unit according to claim 1,
wherein the address memory is embodied to store the collective broadcast address, the individual unit address, and a collective allocation address.

4. The unit according to claim 1,
wherein the input circuit, the output circuit, the control input, and the control output are separated from one another on a circuitry level and/or are connected to one another only by way of a higher-level control logic of the unit.

5. The unit according to claim 1,
wherein the control input is a digital input and the input circuit is embodied to process a digital signal that is present at the control input
or wherein the control input is an analog input and the input circuit is embodied to process an analog signal that is present at the control input.

6. The unit according to claim 1,
wherein the control output is a digital output and the output circuit is embodied to generate a digital signal that is present at the control output
or wherein the control output is an analog output and the output circuit is embodied to generate an analog signal that is present at the control output
or wherein the control output is an open collector and the output circuit is embodied to generate a digital signal that is present at the control output.

7. The unit according to claim 1,
further comprising a voltage output that is configured to be connected directly to the control input
or also having a voltage output that is configured to be or is connected to the control input via a potentiometer or via a switch.

8. The unit according to claim 1,
the unit operable
to switch from an operating mode into an addressing mode upon receipt of an addressing command addressed to the broadcast address via the bus interface or upon receipt of another signal, and
in the addressing mode, to generate an inhibiting signal with the output circuit and to send the inhibiting signal as an output signal at the control output, and, upon receipt of an enable signal at the control input, to switch from the addressing mode into an allocation mode,
in the allocation mode, to store an address, which has been received via the bus interface, as an individual unit address in the address memory and after the storage of the unit address, to switch from the allocation mode into a wait mode, in the wait mode, to generate an enable signal with the output circuit and to send the enable signal as an output signal at the control output.

9. The unit according to claim 8,
further comprising an inhibition circuit,
wherein by way of the inhibition circuit, the unit is embodied
so that it can be switched into the allocation mode only if the control output sends the inhibiting signal and the enable signal is present at the control input.

10. A master/slave bus system with a master and a plurality of units according to claim 1 functioning as slave units,
wherein the master is connected by way of at least one bus line to the units of the plurality of units
and wherein respective pairs of units of the plurality of units are connected to each other by way of a control line, which connects the control output of a first unit to the control input of a second unit so that each of the units of the plurality of units are connected to one another in series by way of the respective control lines.

11. The master/slave bus system according to the preceding claim 10,
wherein the control output of a last unit of the units that are connected to one another in series is connected to the master by way of a last control line.

12. The master/slave bus system according to claim 10,
wherein the master is connected by way of a first control line to the control input of a first unit of the units that are connected to one another in series.

13. A method for addressing a plurality of units, which are connected via at least one bus line to a master to form a bus system,
wherein each unit of the plurality of units respectively has a bus interface for connecting to the bus line, a control input for receiving an input signal, and a control output for sending an output signal,
wherein the control input is connected to an input circuit for processing the input signal and the control output is connected to an output circuit for generating the output signal,
wherein each unit also has an address memory, which is embodied to store a collective broadcast address and an individual unit address,
and wherein respective pairs of units of the plurality of units are connected to each other by way of a control line, which connects the control output of a first unit to the control input of a second unit so that all of the units of the plurality of units are connected to one another in series by way of the respective control lines from an initial unit to a last unit,
and wherein the method comprises at least the following steps:
a. Switching of the plurality of units from an operating mode into an addressing mode,
wherein in the addressing mode, each of the units generate an inhibiting signal with the output circuit and send the inhibiting signal as an output signal at the control output so that the inhibiting signal is present at the control input of a next unit in the series;
b. Switching of the first unit of the units that are connected in series from the addressing mode into an allocation mode by transmission of an enable signal to the control input of the initial unit in the series;
c. Allocation of an address to a unit that is in the allocation mode by transmission of an address to the unit via the bus line and storage of the address as an individual unit address in the address memory;
d. After the storage of the address, switching of the unit from the allocation mode into a wait mode,
wherein in the wait mode, the output circuit of the unit generates a signal that is sent as an output signal in the form of an enable signal at the control output of the unit to the control input of the next unit in the series of units that are connected to one another, as a result of which the next unit in the series is switched into the allocation mode;
e. Repetition of steps c. and d. for each unit until all of the units of the plurality of units are in the wait mode;
f. Switching of the plurality of units from the wait mode into the operating mode.

14. The method according to claim 13,
wherein in order to switch units from the operating mode into the addressing mode, a bus signal is sent by the master via the bus line to all of the units.

15. The method according to claim 13,
wherein after the allocation of the address, the unit is switched into the wait mode automatically or by transmission of a bus signal from the master to the unit.

* * * * *